L. W. WOLFE.
Vehicle Seat.
No. 77,791.
Patented May 12, 1868.
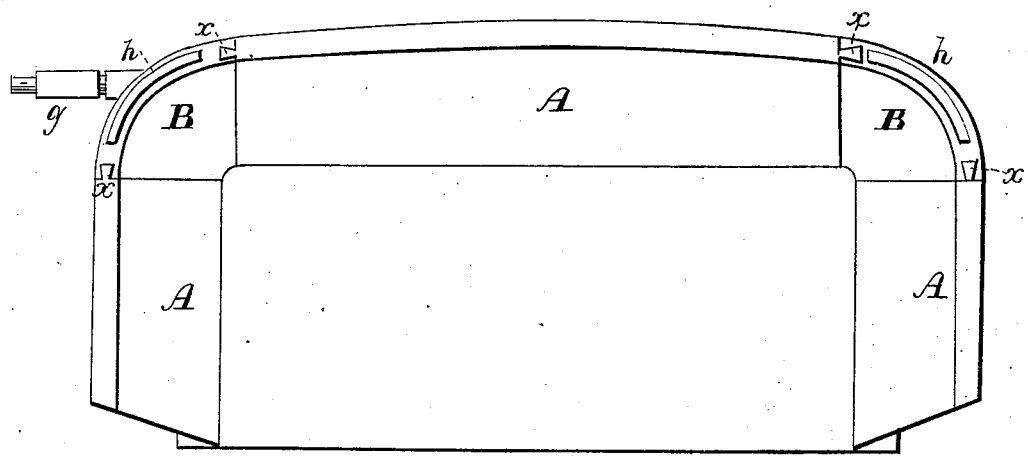

United States Patent Office.

L. W. WOLFE, OF JACKSONVILLE, ILLINOIS.

Letters Patent No. 77,791, dated May 12, 1868.

IMPROVEMENT IN SEATS FOR VEHICLES.

The Schedule referred to in these Letters Patent and making part of the same.

TO ALL WHOM IT MAY CONCERN:

Be it known that I, L. W. WOLFE, of Jacksonville, in the county of Morgan, and in the State of Illinois, have invented certain new and useful Improvements in Seats for Vehicles; and do hereby declare that the following is a full, clear, and exact description thereof, reference being had to the accompanying drawings, and the letters of reference marked thereon.

In the annexed drawings, making a part of this specification, A A represent the ends and back of a seat for vehicles, and B B represent metallic corners thereto, for the purpose of making a fine finish, and adding strength to the seat at said corners.

The ends, back, and bottom of the seat may be made of any required size, material, and style.

The metallic corners B B are made concavo-convex, and provided with dove-tail grooves, $x$ $x$, in the extremities thereof, into which corresponding tenons of the ends and back are driven, making thereby a tight and strong joint.

The corners B are also made hollow, as seen at $h$, and wood driven into the openings, so as to make them lighter than solid metal.

A bolt or pin, $g$, is screwed into each of the corners B, which serves as a convenient prop-block, whenever the same may be required.

This device may be used for the corners of the body of light vehicles, and thus afford a cheap, convenient, and substantial fastening for the sides and ends.

These corners may be cast of any metal that is desired.

Having thus fully described my invention, what I claim as new, and desire to secure by Letters Patent, is—

The arrangement of the seat A with the hollow concavo-convex metallic corners B B, as herein described, all constructed and used substantially as set forth.

In testimony that I claim the foregoing, I have hereunto set my hand, this 5th day of February, 1868.

L. W. WOLFE.

Witnesses:
 JOHN WOOD,
 GEORGE HAYDEN.